UNITED STATES PATENT OFFICE.

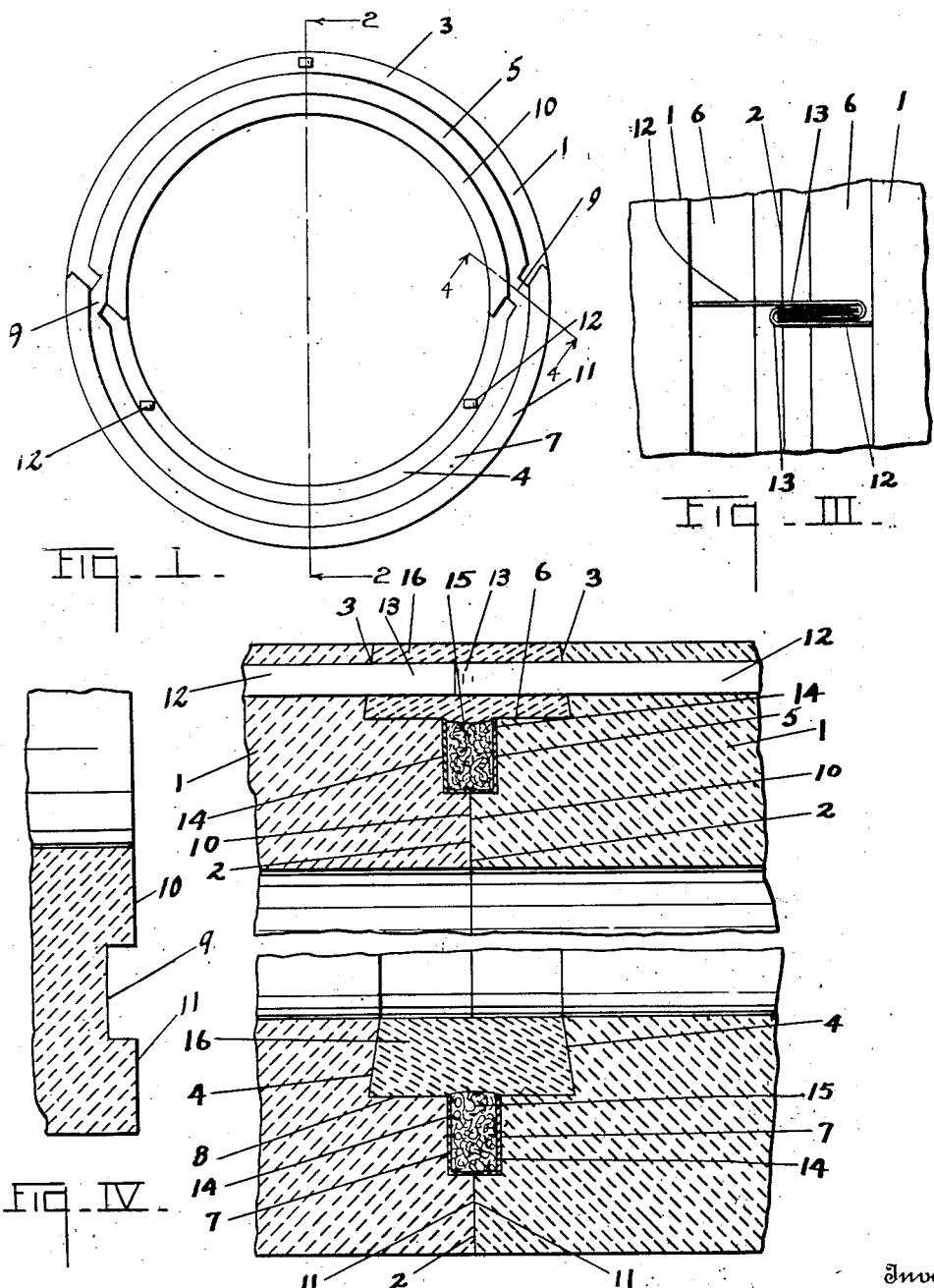

DAVID D. TRACY, OF JACKSON, MICHIGAN.

SECTIONAL CONDUIT.

1,396,301.  Specification of Letters Patent. Patented Nov. 8, 1921.

Application filed July 17, 1920. Serial No. 397,028.

*To all whom it may concern:*

Be it known that I, DAVID D. TRACY, a citizen of the United States, residing at Jackson, county of Jackson, and State of Michigan, have invented certain new and useful Improvements in Sectional Conduits, of which the following is a specification.

This invention relates to improvements in sectional conduits.

My improvements relate particularly to the joints for sectional conduits and are particularly designed for use in concrete conduits for gas, sewer, water and other purposes, and are well adapted as conduits for fluids under pressure.

The main object of this invention is to provide an improved joint for sectional conduit which enables the rapid laying of the conduit and one which may be readily made gas and water tight.

Further objects, and objects relating to structural details, will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing forming a part of this specification, in which:

Figure I is an end view of a conduit embodying the features of my invention.

Fig. II is an enlarged detail longitudinal section on a line corresponding to line 2—2 of Fig. I, the coupling bars being shown in full lines.

Fig. III is a detail top view.

Fig. IV is an enlarged detail section on a line corresponding to line 4—4 of Fig. I.

In the drawing similar reference characters refer to similar parts throughout the several views.

In the accompanying drawing, I have not attempted to maintain the relative proportions of the parts which might be desirable in practice, that is, the thickness of the walls relative to their other dimensions and, further, these proportions will be varied according to the various requirements and conditions of installation and the particular purpose for which the conduit is intended.

The conduit sections 1 are formed of concrete and have abutting ends 2. The conduit sections have stepped externally registering grooves 3 embracing substantially the upper halves thereof and stepped internally registering grooves 4 embracing substantially the lower halves thereof, thus providing a shouldered external joint having an internal portion 5 and a wider external portion 6 and an internal shouldered joint channel having an inner portion 7 and a wider outer portion.

The ends of the inner portions of the channels are connected, providing a continuous inner groove. The ends 10 and 11 are flush and abut.

Coupling bars 12 are embedded in the sections with their ends projecting into the outer portions of the channels and terminating in hooks 13 open at their sides so that the hooks may be engaged by the lateral movement of the conduit sections when their ends are in abutting relation, all the hooks being faced or positioned in the same relation so that they are all simultaneously engaged.

The inner portions 5 and 7 of the channels are preferably provided with a coating 14 of tar or asphaltum and are filled or calked with a fibrous material 15 such as hemp providing a continuous calked joint. The outer portions 6 and 8 of the joints are then filled with cement 16. The side walls of these channels are preferably inclined as indicated.

With the parts thus arranged my improved conduit sections may be quickly laid, it only being necessary to abut the ends and shift them laterally to engage the hooks. The joint channels are open for calking or filling and when filled the coupling bars are embedded so that they cannot open.

My improved conduit is, as stated, adapted for gas and water under heavy pressure and on account of the economy in manufacture and convenience in laying the same is very desirable for general use.

Having thus described my invention, what I claim as new and desire to secure by Letters Patent, is:

1. A sectional conduit comprising tubular sections having abutting ends with stepped external registering grooves in their upper portion and stepped internal registering grooves in their lower portions providing a shouldered external joint channel embracing substantially the upper half of the sections and a shouldered internal joint channel embracing substantially the lower half thereof, the ends of the inner portions of the channels being connected providing a continuous inner channel, coupling bars embedded in said conduit sections and projecting at the ends thereof into the outer portions of said channels and terminating in rearwardly turned coacting hooks open at their sides and disposed so that the hooks may be simultaneously engaged by a lateral movement of the sections with their ends in abutting relation, a packing of fibrous material for the inner portions of said channels, the walls of the inner portions of said channels being coated with a waterproof material, and a cement filling for the outer portions of said channels embedding the engaged hooks.

2. A sectional conduit comprising tubular sections having abutting ends with stepped external registering grooves in their upper portion and stepped internal registering grooves in their lower portions providing a shouldered external joint channel embracing substantially the upper half of the section and a shouldered internal joint channel embracing substantially the lower half thereof, coupling bars embedded in said conduit sections and projecting at the ends thereof into the outer portions of said channels and terminating in rearwardly turned coacting hooks open at their sides and disposed so that the hooks may be simultaneously engaged by a lateral movement of the sections with their ends in abutting relation, a calking for the inner portions of said channels, and a cement filling for the outer portions of said channels embedding said engaged hooks.

In witness whereof I have hereunto set my hand and seal in the presence of two witnesses.

DAVID D. TRACY. [L. S.]

Witnesses:
GEORGE E. BAILEY,
JOSEPH W. EATON.